United States Patent
Andrianov

(10) Patent No.: US 7,925,877 B2
(45) Date of Patent: Apr. 12, 2011

(54) METHOD, SYSTEM AND APPARATUS FOR PROVIDING A BOOT LOADER OF AN EMBEDDED SYSTEM

(75) Inventor: Vitaly Andrianov, Rockville, MD (US)

(73) Assignee: Texas Instruments Incorporated, Dallas, TX (US)

( * ) Notice: Subject to any disclaimer, the term of this patent is extended or adjusted under 35 U.S.C. 154(b) by 852 days.

(21) Appl. No.: 11/902,989

(22) Filed: Sep. 27, 2007

(65) Prior Publication Data
US 2009/0089570 A1 Apr. 2, 2009

(51) Int. Cl.
*G06F 15/177* (2006.01)
(52) U.S. Cl. .................. 713/2; 713/1; 713/100
(58) Field of Classification Search .......... 713/1, 2, 713/100
See application file for complete search history.

(56) References Cited

U.S. PATENT DOCUMENTS

| | | | |
|---|---|---|---|
| 5,878,256 A * | 3/1999 | Bealkowski et al. ............. 713/2 | |
| 6,446,203 B1 | 9/2002 | Aguilar et al. | |
| 6,560,703 B1 | 5/2003 | Goodman | |
| 6,834,384 B2 | 12/2004 | Fiorella, Jr. et al. | |
| 2005/0060528 A1 * | 3/2005 | Kim ................................. 713/1 |
| 2006/0129793 A1 | 6/2006 | Tzeng | |
| 2007/0050611 A1 * | 3/2007 | Weikel ............................. 713/2 |
| 2007/0083744 A1 * | 4/2007 | Seok ................................ 713/1 |
| 2007/0088940 A1 * | 4/2007 | M. Conley ....................... 713/1 |
| 2007/0113067 A1 * | 5/2007 | Oh et al. .......................... 713/2 |
| 2007/0169098 A1 * | 7/2007 | Kikuchi ........................ 717/168 |

* cited by examiner

*Primary Examiner* — Dennis M Butler
(74) *Attorney, Agent, or Firm* — Steven A. Shaw; W. James Brady; Frederick J. Telecky, Jr.

(57) ABSTRACT

A method, system and apparatus for executing a boot loader for an embedded system including a system-on-chip (SOC) processor coupled to a memory including first boot loader code for implementing a first boot loader stored in a first sector and second boot loader code for implementing a second boot loader stored in a second sector determines which of the first boot loader code and second boot loader code is younger; if the second boot loader code is determined to be younger than the first boot loader code, a swapping operation is performed so that the second boot loader code is associated with the first sector and the first boot loader code is associated with a different sector, and the boot loader code associated with the first sector is executed.

17 Claims, 2 Drawing Sheets

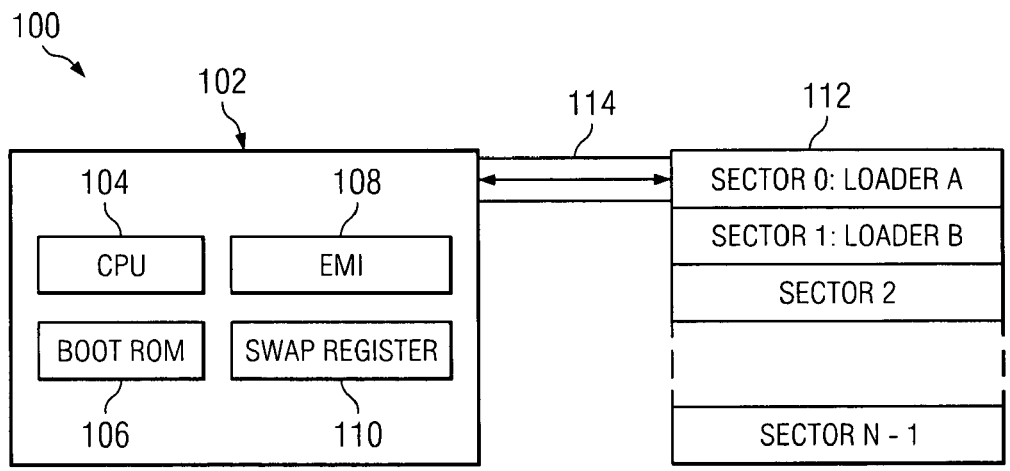
FIG. 1
```
Jmp Start        //branch to the boot loader start
DW VersionID     //Boot loader version ID
DW Length        //Boot loader length
DW CSUM          //Boot loader check sum
Bootloader code starts here
```
FIG. 2
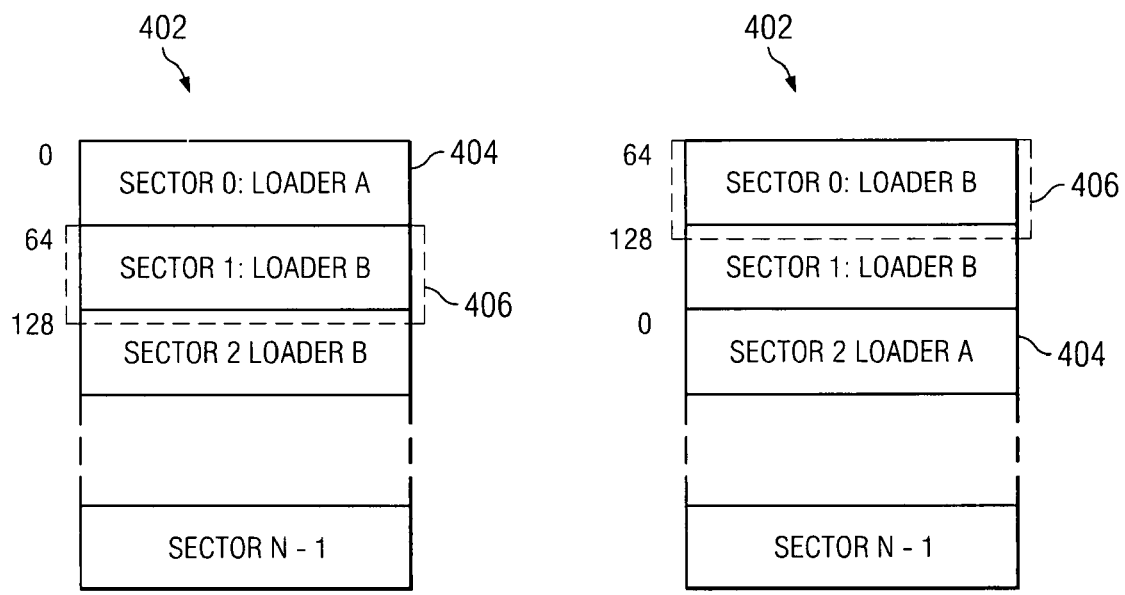
FIG. 4A          FIG. 4B

METHOD, SYSTEM AND APPARATUS FOR PROVIDING A BOOT LOADER OF AN EMBEDDED SYSTEM

TECHNICAL FIELD

The technical field relates generally to firmware of an embedded system and, more particularly, to firmware for providing a boot loader.

BACKGROUND

A conventional embedded system includes a system-on-chip (SOC) processor, a memory such as flash memory and/or static random access memory (SRAM), and limited peripherals. System firmware stored in the memory can be upgraded after the system has been deployed to a customer. It is preferably more cost effective to perform such system firmware upgrades remotely via a network connection.

However, performing a remote upgrade on sensitive system firmware such as the boot loader can be dangerous due to the structured relationship between the core CPU of the SOC processor and the boot loader. Particularly, because the core CPU always boots from a hardware defined address, the boot loader is required to be in a predetermined sector of the flash memory, which is generally the first sector of the main flash memory. The CPU can select the boot loader by a Flash Chip Select (CS) signal. However, when upgrading the boot loader, an erase-upgrade sequence has to be performed. If a power fault occurs during this sequence before completion, the system will not be able to be restored without being brought directly to the system manufacturer.

Therefore, what is needed is a method, system or apparatus for providing a boot loader in an embedded system that can be upgraded remotely via a network having a reduced risk of system failure.

SUMMARY

Accordingly, an embedded system includes a SOC processor and a flash memory coupled to the SOC processor via an addressing bus. The flash memory includes a first boot loader code stored in a first sector and a second boot loader code stored in a second sector. The SOC processor includes a CPU and a memory coupled to the CPU, the memory for storing instructions for configuring the CPU.

The CPU is configured to: determine which of the first boot loader code and second boot loader code is younger; and execute the second boot loader code if the second boot loader code is determined to be younger than the first boot loader code.

The embedded system can further include: an external memory interface (EMI) for selecting an address of one of the first and second sectors in the flash memory; and a swap register coupled to the CPU for controlling the EMI.

The CPU can be further configured to: activate the swap register to set the EMI so that an address of the second boot loader code is swapped with an address of the first sector if the second boot loader code is determined to be younger than the first boot loader code; and execute the boot loader code associated with the first sector. That is, after the swap, the address of the second boot loader code will be of the first sector if the second boot loader code is determined to be younger. Thus, the boot loader code associated with the first sector becomes the second boot loader code.

The CPU can be further configured to: compare a first header of the first boot loader code with a second header of the second boot loader code to determine which is younger; if the second boot loader code is determined to be younger than the first boot loader code, compute a checksum for the second boot loader code and compare the computed checksum with a checksum in the second header; and activate the swap register to set the EMI only if the second boot loader code is determined to be younger than the first boot loader code and the computed second checksum is equal to the checksum in the second header.

In an embedded system including a system-on-chip (SOC) processor and a memory including a first sector and a second sector, the memory including a first boot loader code for implementing a first boot loader stored in the first sector and a second boot loader code for implementing a second boot loader stored in the second sector, a method of executing a boot loader includes: determining which of the first boot loader code and second boot loader code is younger; if the second boot loader code is determined to be younger than the first boot loader code, performing a swapping operation so that the second boot loader code is associated with the first sector and the first boot loader code is associated with a different sector; and executing the boot loader code associated with the first sector.

BRIEF DESCRIPTION OF THE DRAWINGS

The accompanying figures, in which like reference numerals refer to identical or functionally similar elements, together with the detailed description below are incorporated in and form part of the specification and serve to further illustrate various exemplary embodiments and explain various principles and advantages in accordance with the present invention.

FIG. 1 is a block diagram of exemplary portions of an exemplary embedded system;

FIG. 2 is an illustration of an exemplary header for boot loader code;

FIGS. 4A-4B are exemplary logical representations of a flash memory.

DETAILED DESCRIPTION

Figure 3:
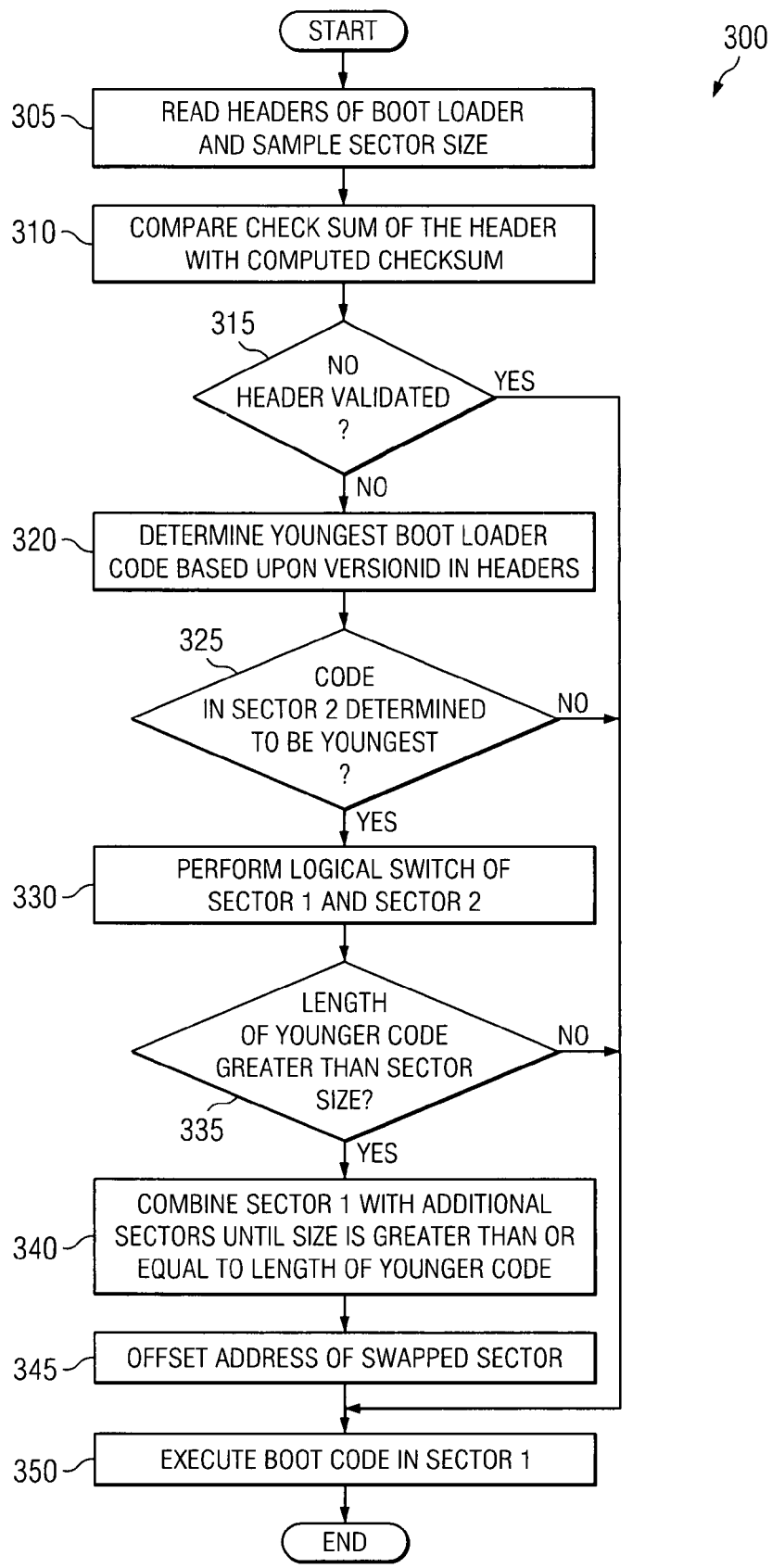
FIG. 3 is a flow diagram illustrating an exemplary procedure for executing the boot loader.

In overview, the present disclosure concerns an embedded system, a central processing unit (CPU), a memory associated with the CPU, and computer readable instructions stored in the memory for configuring the CPU. More particularly, various inventive concepts and principles are embodied in systems, apparatuses, and methods for providing a boot loader.

The instant disclosure is provided to further explain in an enabling fashion the best modes of performing one or more embodiments of the present invention. The use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in computer instructions (software) or integrated circuits (ICs), and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

As discussed above, performing a remote update on sensitive system firmware such as the boot loader can be dangerous due to the risk of a power fault occurring during the erase-upgrade sequence. One approach for safely performing a remote upgrade to the system firmware implementing the boot loader would be to upload the boot loader onto another sector of the flash memory, and then finish the operation only after the previous boot loader has been completely erased. However, this approach is not possible for a conventional embedded system because the CPU always expects the boot loader to be in the same location of the flash memory.

Referring to FIG. 1, a block diagram of portions of an exemplary embedded system 100 in which the boot loader can be upgraded from an alternative section of the flash memory will now be discussed. The embedded system 100 includes a system-on-chip (SOC) processor 102 and a flash memory 112. The SOC processor 102 includes a CPU 104, a Boot Read Only Memory (ROM) 106, an External Memory Interface (EMI) 108, and a swap register (REG) 110. The SOC processor 102 can be coupled to the flash memory 112 via an address bus and a flash chip select, illustrated here solely by the bus 114.

The EMI 108 is for addressing the various sectors of the flash memory 112. Particularly, the EMI 108 can generate a flash chip select signal to select one or more addressed sectors of the main flash memory 112. The swap REG 110 is for controlling the EMI 108 in accordance with swap REG control instructions discussed below.

The flash memory 112 includes a plurality of sectors 0, 1, 2 . . . N−1. In the present case, the first sector (Sector 0) is reserved for storing a boot loader program (the first boot loader code), and the second sector (Sector 1) is used for storing a boot loader program upgrade. The upgrade (second boot loader code) can be completely different from the boot loader code of Sector 0, or it can include merely a patch to correct a few lines of code from the first boot loader code. Further, the second boot loader code can be installed remotely via a network connection (not shown).

The Boot ROM 106 can include instructions for configuring the CPU 104, such as instructions to search for devices eligible to participate in the boot process, and boot instructions to load a program from the boot sector (in this case the first sector: sector 0) of the main flash memory 112. The Boot ROM 106 can also include various instructions such as sector comparison instructions, swap REG control instructions, checksum computation and comparison instructions, and sector size adjustment instructions for configuring the CPU 104, each of which will be discussed more fully below.

The sector comparison instructions configure the CPU 104 to determine which of the first boot loader code and second boot loader code is younger by, for example, comparing a first header of the first boot loader code with a second header of the second boot loader code. An exemplary header 200 is shown in FIG. 2. The header 200 includes a boot loader version identification parameter shown as "DW VersionID" which can be compared with a boot loader version identification parameter specified by a header of the second boot loader code to determine which of the first boot loader code and second boot loader code is younger.

The swap REG control instructions configure the CPU 104 to activate the swap register 110 to set the EMI 108 so that the second boot loader code is associated with an address of the first sector and an address of the first boot loader code is associated with a different sector if the second boot loader code is determined to be younger than the first boot loader code. The address of the first boot loader code after the swap will depend upon a determination performed in accordance with the sector size adjustment instructions discussed below.

The checksum computation and comparison instructions configure the CPU 104 to validate the headers by computing a checksum for the first and second boot loader codes and comparing the computed checksums with checksums in the headers. The exemplary header 200 includes a checksum shown as "DW CSUM." The checksum can be computed according to conventional techniques. If the second boot loader code is determined to be younger than the first boot loader code, the swap register 110 will be activated to perform the swap operation only if the computed second checksum is equal to the checksum in the second header. If none of the headers are validated, then the CPU 104 can execute the first boot loader code stored in the first sector by default.

The sector size adjustment instructions configure the CPU 104 to sample configuration bits of the flash memory 112 to determine a flash sector size of each of the first and second sectors of the flash memory 112, and to determine a size of the first boot loader code and the second boot loader code. If the second boot loader code is determined to be younger than the first boot loader code and if the flash sector size of the first sector is less than a size of the younger boot loader code, a new first sector having a size greater than or equal to the size of the younger boot loader code can be configured by combining the first sector with one or more additional sectors to form a new first sector.

The swap REG control instructions can further configure the CPU 104 to assign an address of the first sector as the address of the second sector and assign a new address for the first sector that is offset from the address of the second sector by the size of the younger boot loader code. As a result, when the CPU 104 generates a control signal to the EMI 108 to execute the boot code in sector 0 (the default sector for boot loading program), the EMI 108 will select the boot code in sector 1.

Referring to FIG. 3 an exemplary procedure 300 for executing a boot loader for the embedded system 200 will be discussed. The procedure 300 can begin, for example, when the embedded system 200 is powered on after receiving a remote upgrade which stored a new boot loader program (second boot loader) in the second sector. It should be noted that the second boot loader can also be stored in additional sectors as well as the second sector if the size of the second boot loader is greater than a size of the second sector.

Upon being powered on, at 305 the CPU reads the headers of the first boot loader code and the second boot loader code and samples flash configuration bits to determine a sector size of the first and second sectors. Referring to the exemplary header 200, the headers include the parameters DW VersionID and DW CSUM discussed above, and a branch instruction shown as "Jmp Start" and a length (size) of the boot loader length shown as "DW Length." At 310, the CPU can compare the checksum of the headers with a computed checksum to check the validity of each of the headers.

At 315, the CPU determines if no header can be validated. That is, the CPU determines if no computed checksum for a boot loader code is equal to the checksum in its corresponding header. If no header can be validated (YES at 315), then at 350 the CPU executes the boot loader code stored in the first sector by default. However, if a header is validated (NO at 315), then at 320 the CPU determines which of the first boot loader code and second boot loader code is younger based upon, for example, a comparison of the boot loader version identification parameter (DW VersionID) stored in the header of the first boot loader code with a boot loader version identification parameter stored in the header of the second boot loader code.

If, at 325, the second boot loader code is determined not to be younger than the first boot loader code (NO at 325), then at 350 the CPU executes the boot loader code stored in the first sector. If, at 325, the second boot loader code is determined to be younger than the first boot loader code (YES at 325), then at 330 the CPU performs a swapping operation so that the second boot loader code is associated with the first sector and the first boot loader code is associated with the second sector. Particularly, here the EMI can be set by the swap register to logically switch a first sector address associated with the first sector with a second sector address associated with the second sector. Thereby, when the CPU selects the first sector, the EMI will set the address of the second sector.

At 335, the CPU can determine the size of the second boot loader code (if it is determined to be youngest). If the size of the second boot loader code is determined to be greater than the sector size of the first sector (YES at 335), then at 340 the first sector can be combined (logically) with one or more additional sectors to have a flash sector size greater than or equal to the size of the younger boot loader code. At 345, the address of the second sector is logically offset from the first sector address by the size of the new combined sector, which should be at least the size of the younger boot loader code. Thereby, when the CPU selects the second sector, the EMI will set an address offset from the (new) first sector. If the size of the second boot loader code is determined not to be greater than the sector size of the first sector (NO at 335), then the boot loader code in the first sector is executed.

Referring to FIGS. 4A-4B, an exemplary swapping and sector size adjustment operation will be discussed. Here, a logical representation of the flash memory 402 before the swapping operation is shown in FIG. 4A and after the swapping and sector size adjustment operation in FIG. 4B.

In this example, each of the sectors (0, 1 ... N−1) has a sector size of 64K. The boot loader A 404 stored in the sector 0 (first sector) has a size that is less than 64K. However, the boot loader B 406 stored in sectors 1 and 2, which is younger than boot loader A 404, has a size of 80K. As discussed above, the flash sector size can be determined by sampling configuration bits and the size of boot loader B 406 can be determined based upon the DW length in the header.

As shown in FIG. 4B, because boot loader B 406 is younger than boot loader A 404, the address (64) of boot loader B 406 is swapped with the address (0) of boot loader A 404, so that boot loader B 406 is logically in the first sector from the perspective of the CPU. That is, when the CPU attempts to access sector 0, the swap register forces the EMI to select the address of sector 1 (which is at address 64).

The configured sector size must be set to a value equal to or greater than the boot loader size and at a flash size boundary. Because the boot loader B size of 80K is greater than the flash sector size of 64K, sector 0 (the first sector) is logically combined with the second sector (sector 1) to have a flash sector size of 128K, which is greater than the size of the younger boot loader code. More specifically, the swap register assigns a new address for boot loader A which is offset by 128K from the address of boot loader B. That is, when the CPU attempts to access sector 1, the swap register forces the EMI to select the address of sector 2 (which is now at address 0).

As a result, an upgrade can be installed remotely via a network into the second sector (sector 1). Thereby, even if a power fault occurs during installation, the original boot code still remains in the first sector (sector 0). Further, the swapping operation permits the CPU to continue to boot from the first sector.

It should be noted that the swap register preferably only logically swaps the address of the boot loader code. That is, the physical location of the boot loader code in the flash memory is not moved. Rather, the swap register merely forces the EMI to change the addressing. As a result, the CPU can continue to request the boot operation from the first sector.

In the previous examples, the flash sector only included first and second boot loader codes. However, the embodiments discussed above are also applicable to a flash sector including a plurality of boot loader codes. The CPU can determine which among the plurality of boot loader codes is the youngest, and logically swap the address of the youngest boot loader code with the address of the first sector.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed.

Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of executing a boot loader for an embedded system including a system-on-chip (SOC) processor and a memory including a first sector and a second sector, the memory including first boot loader code for implementing a first boot loader stored in the first sector and a second boot loader code for implementing a second boot loader stored in the second sector, the method comprising:
   determining which of the first boot loader code and second boot loader code is younger comprising sampling flash configuration bits to determine a sector size of each of the first and second sectors;
   if the second boot loader code is determined to be younger than the first boot loader code, performing a swapping operation so that the second boot loader code is associated with the first sector and the first boot loader code is associated with a different sector; and
   executing the boot loader code associated with the first sector.

2. The method of claim 1, wherein the determining which of the first boot loader code and second boot loader code is younger further includes comparing a header of the first boot loader code with a header of the second boot loader code to determine which is younger.

3. The method of claim 2, further comprising executing the boot loader code stored in the first sector by default if no valid header is present in the memory.

4. The method of claim 2, wherein the comparing a header of the first boot loader code with a header of the second boot loader code further includes comparing a boot loader version identification parameter stored in the header of the first boot loader code with a boot loader version identification parameter stored in the header of the second boot loader code.

5. The method of claim 1, wherein the performing of the swapping operation further includes swapping a first sector address associated with the first sector and a second sector address associated with the second sector.

6. The method of claim 1, further comprising:
if the second boot loader code is determined to be younger than the first boot loader code, determining if a size of the second boot loader code is greater than the sector size of the first sector; and
offsetting the first sector address from the second sector address by at least the size of the second boot loader code during the swap operation if the size of the second boot loader code is greater than the sector size of the first sector.

7. A method of executing a boot loader for an embedded system including a system-on-chip (SOC) processor and a memory having a plurality of sectors, the memory including first boot loader code for implementing a first boot loader associated with a first sector of the plurality of sectors and a second boot loader code for implementing a second boot loader associated with a second sector of the plurality of sectors, the method comprising:
sampling a plurality of configuration bits to determine a flash sector size of each of the plurality of sectors;
determining a size of the first boot loader code and a size of the second boot loader code;
comparing a first header of the first boot loader code with a second header of the second boot loader code to determine which is younger;
if the second boot loader code is determined to be younger than the first boot loader code, computing a checksum for the second boot loader code and comparing the computed checksum with a checksum in the second header;
if the second boot loader code is determined to be younger than the first boot loader code and the computed second checksum is equal to the checksum in the second header, performing a swapping operation so that the second boot loader code is associated with the first sector and the first boot loader code is associated with the second sector; and
executing the boot loader code associated with the first sector.

8. The method of claim 7, wherein the performing the swapping operation further includes:
if the flash sector size of each of the plurality of sectors is less than a size of the younger boot loader code, combining the first sector with one or more additional sectors to have a flash sector size greater than or equal to the size of the younger boot loader code.

9. The method of claim 7, wherein the performing of the swapping operation further includes assigning an address of the first sector as the address of the second sector and assigning a new address for the first sector that is offset from the address of the second sector by at least the size of the younger boot loader code.

10. The method of claim 7, wherein the comparing a header of the first boot loader code with a header of the second boot loader code further includes comparing a boot loader version identification parameter stored in the header of the first boot loader code with a boot loader version identification parameter stored in the header of the second boot loader code.

11. An embedded system comprising:
a system-on-chip (SOC) processor including a central processing unit (CPU) and a memory coupled to the CPU, the memory for storing instructions for configuring the CPU; and
a flash memory coupled to the SOC processor via an addressing bus, the flash memory including a first boot loader code stored in a first sector and a second boot loader code stored in a second sector;
wherein the CPU is configured to:
sample a plurality of configuration bits of the flash memory to determine a flash sector size of each of the first and second sectors of the flash memory;
determine which of the first boot loader code and second boot loader code is younger; and
execute the second boot loader code if the second boot loader code is determined to be younger than the first boot loader code.

12. The embedded system of claim 11, further comprising:
an external memory interface (EMI) coupled to the CPU, the EMI for addressing the flash memory,
wherein the CPU is further configured to:
set the EMI so that the second boot loader code is associated with an address of the first sector and the first boot loader code is associated with an address of a different sector if the second boot loader code is determined to be younger than the first boot loader code; and
execute the boot loader code associated with the address of the first sector.

13. The embedded system of claim 11, further comprising:
an external memory interface (EMI) for selecting an address of one of the first and second sectors in the flash memory; and
a swap register for controlling the EMI, the swap register coupled to the CPU, wherein the CPU is further configured to:
activate the swap register to set the EMI so that an address of the second boot loader code is swapped with an address of the first sector if the second boot loader code is determined to be younger than the first boot loader code; and
execute the boot loader code associated with the first sector.

14. The embedded system of claim 13, wherein the CPU is further configured to:
compare a first header of the first boot loader code with a second header of the second boot loader code to determine which is younger;
if the second boot loader code is determined to be younger than the first boot loader code, compute a checksum for the second boot loader code and compare the computed checksum with a checksum in the second header; and
activate the swap register to set the EMI only if the second boot loader code is determined to be younger than the first boot loader code and the computed second checksum is equal to the checksum in the second header.

15. The embedded system of claim 11, wherein the CPU is further configured to:
determine a size of the first boot loader code and the second boot loader code; and
if the second boot loader code is younger than the first boot loader code and if the flash sector size of the first sector is less than a size of the second boot loader code, combine the first sector with one or more additional sectors to form a new first sector having a size greater than or equal to the size of the younger boot loader code.

16. The embedded system of claim 11, wherein the CPU is further configured to:

assign an address of the first sector as the address of the second sector and assign a new address for the first sector that is offset from the address of the second sector by at least the size of the younger boot loader code.

17. The embedded system of claim 11, wherein the CPU is further configured to: compare a boot loader version identification parameter specified by a header of the first boot loader code with a boot loader version identification parameter specified by a header of the second boot loader code to determine which of the first boot loader code and second boot loader code is younger.

* * * * *